(12) United States Patent
Kim et al.

(10) Patent No.: US 10,014,495 B2
(45) Date of Patent: Jul. 3, 2018

(54) RECHARGEABLE BATTERY

(71) Applicant: SAMSUNG SDI CO., LTD., Yongin-si, Gyeonggi-do (KR)

(72) Inventors: Sung-Kab Kim, Yongin-si (KR); Yong-Sam Kim, Yongin-si (KR); Se-Jong Park, Yongin-si (KR); Sung-Hoon Kim, Yongin-si (KR); Myung-Jae Jang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 210 days.

(21) Appl. No.: 14/180,821

(22) Filed: Feb. 14, 2014

(65) Prior Publication Data

US 2014/0342220 A1    Nov. 20, 2014

Related U.S. Application Data

(60) Provisional application No. 61/823,639, filed on May 15, 2013.

(51) Int. Cl.
| | |
|---|---|
| *H01M 2/02* | (2006.01) |
| *H01M 2/32* | (2006.01) |
| *H01M 2/34* | (2006.01) |
| *H01M 10/0525* | (2010.01) |
| *H01M 10/052* | (2010.01) |

(52) U.S. Cl.
CPC ........... *H01M 2/02* (2013.01); *H01M 2/0202* (2013.01); *H01M 2/0237* (2013.01); *H01M 2/32* (2013.01); *H01M 2/34* (2013.01); *H01M 2/028* (2013.01); *H01M 2/029* (2013.01); *H01M 2/0217* (2013.01); *H01M 2/0267* (2013.01); *H01M 2/0277* (2013.01); *H01M 10/052* (2013.01); *H01M 10/0525* (2013.01)

(58) Field of Classification Search
CPC .... H01M 2/02; H01M 2/0202; H01M 2/0237; H01M 2/32; H01M 2/34; H01M 10/052; H01M 2/0277; H01M 2/028; H01M 2/029

See application file for complete search history.

(56) References Cited

U.S. PATENT DOCUMENTS

| | | | |
|---|---|---|---|
| 6,682,847 | B2 | 1/2004 | Inoue |
| 7,709,143 | B2 | 5/2010 | Lee |

(Continued)

FOREIGN PATENT DOCUMENTS

| | | |
|---|---|---|
| CN | 1728434 A | 2/2006 |
| CN | 101908613 A | 12/2010 |

(Continued)

OTHER PUBLICATIONS

Search Report dated Sep. 9, 2014 in corresponding European Patent Application No. 14156355.1.

(Continued)

*Primary Examiner* — Jeremiah R Smith (74) *Attorney, Agent, or Firm* — Lee & Morse P.C.

(57) ABSTRACT

A rechargeable battery includes a case, an electrode assembly disposed in the case, and an insulating member disposed in the case, the insulating member being fixed to the electrode assembly, the insulating member including a first portion and a second portion, the second portion extending from the first portion and contacting the electrode assembly at a coated region of the electrode assembly.

20 Claims, 9 Drawing Sheets

(56) References Cited

U.S. PATENT DOCUMENTS

| | | | |
|---|---|---|---|
| 2006/0024568 A1* | 2/2006 | Lee | H01M 2/14 429/130 |
| 2008/0233474 A1 | 9/2008 | Son et al. | |
| 2010/0310912 A1* | 12/2010 | Kim | H01M 10/0431 429/94 |
| 2011/0052975 A1 | 3/2011 | Lee | |
| 2011/0052976 A1 | 3/2011 | Ishii et al. | |
| 2011/0059338 A1* | 3/2011 | Baek | H01M 2/0404 429/7 |
| 2012/0088146 A1 | 4/2012 | Byun | |
| 2012/0160559 A1 | 6/2012 | Tsutsumi et al. | |
| 2012/0164501 A1 | 6/2012 | Guen | |
| 2012/0171525 A1 | 7/2012 | Guen | |
| 2012/0301759 A1 | 11/2012 | Yoshitake et al. | |

FOREIGN PATENT DOCUMENTS

| | | |
|---|---|---|
| CN | 102005602 A | 4/2011 |
| CN | 102447128 A | 5/2012 |
| CN | 102544411 A | 7/2012 |
| CN | 102800824 A | 11/2012 |
| EP | 2-290-732 A1 | 3/2011 |
| EP | 2-528-131 A1 | 11/2012 |
| JP | 2008-251189 A | 10/2008 |
| JP | 2011-054567 A | 3/2011 |
| JP | 2011-150961 A | 8/2011 |
| JP | 2012-156093 A | 8/2012 |
| JP | 2013-109858 A | 6/2013 |
| KR | 10-2004-0058922 A | 7/2004 |
| KR | 10-2008-0085316 A | 9/2008 |
| KR | 10-2012-0075849 A | 7/2012 |
| KR | 10-2012-0132353 A | 12/2012 |

OTHER PUBLICATIONS

European Office Action dated Apr. 29, 2016.
Office Action dated Jul. 24, 2017, of the corresponding Chinese Patent Application No. 201410201999.6.
European Office Action dated Oct. 6, 2017, of the corresponding European Patent Application No. 14156355.1.
Chinese Office Action dated Mar. 7, 2018, of the corresponding Chinese Patent Application No. 201410201999.6.
Japanese Office Action dated Mar. 19, 2018, of the corresponding Japanese Patent Application No. 2014-096640.

\* cited by examiner

RECHARGEABLE BATTERY

CROSS-REFERENCE TO RELATED APPLICATION

This application claims priority to U.S. Provisional Application No. 61/823,639, filed in the U.S. Patent and Trademark Office on May 15, 2013, and entitled "RECHARGEABLE BATTERY," which is hereby incorporated by reference herein in its entirety for all purposes.

BACKGROUND

1. Field

Embodiments relate to a rechargeable battery.

2. Description of the Related Art

Rechargeable batteries are batteries that can be repeatedly recharged and discharged. Low-capacity rechargeable batteries are used for small portable electronic devices such as mobile phones, laptop computers, and camcorders, and large-capacity chargeable batteries are widely used as power supplies for driving motors for hybrid cars or the like.

High-output rechargeable batteries using a non-aqueous electrolyte with high energy density have been developed. The high-output rechargeable batteries may be configured as large-capacity battery modules in which a plurality of rechargeable batteries are connected to each other, e.g., in series and/or parallel, so as to be used for driving motors for devices requiring large power, for example, electric cars, or the like.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery, including a case, an electrode assembly disposed in the case, and an insulating member disposed in the case, the insulating member being fixed to the electrode assembly, the insulating member including a first portion and a second portion, the second portion extending from the first portion and contacting the electrode assembly at a coated region of the electrode assembly.

The second portion may have a curved shape and contact a curved edge of the electrode assembly.

The first portion may have a plate shape and contact a side of the electrode assembly.

The second portion may be elastically deformable and have a radius of curvature, prior to being combined with the electrode assembly, that is the same as or smaller than a radius of curvature of the curved edge of the electrode assembly.

The second portion may have a shape corresponding to the curved edge of the electrode assembly.

The second portion may extend along the curved edge of the electrode assembly.

The second portion may include a plurality of parts that have a radius of curvature, prior to being combined with the electrode assembly, that is the same as or smaller than a radius of curvature of the curved edge of the electrode assembly, the parts being disposed along the curved edge of the electrode assembly.

The first portion may have first and second edges spaced apart by a first width, the first width being at least as great as a width of the electrode assembly.

The first portion may have a size sufficient to prevent any edge of the electrode assembly from projecting beyond an edge of the first portion when the insulating member is combined with the electrode assembly.

The second portion may be proximate to a cap plate that closes the case, and the electrode assembly may be between the second portion and a bottom of the case.

The first portion may be interposed between the electrode assembly and a side of the case.

The insulating member may include a third portion that extends from the first portion, the third portion opposing the second portion with the electrode assembly therebetween.

The third portion may be curved to correspond to a curved edge of the electrode assembly.

The third portion may contact the electrode assembly at a coated region of the electrode assembly.

The third portion may include a curved part and a flat part, the curved part extending from the first portion, the flat part extending from the curved part and at least partially covering a side of the electrode assembly.

The electrode assembly may be interposed between the first portion and the flat part of the third portion.

The second portion may be proximate to a cap plate that seals the case, and the curved part of the third portion may be proximate to a bottom of the case, and the first portion may be proximate to a first side of the case, and the flat part of the third portion may be proximate to a second side of the case.

The electrode assembly may be interposed between the first portion and the flat part of the third portion, and the first portion, the electrode assembly, and the flat part of the third portion may be interposed between the first and second sides of the case.

The electrode assembly may include a first electrode, a second electrode, and a separator interposed between the first and second electrodes, the separator being formed of an insulating material, the separator contacting the insulating member.

The case may be rectangular, having two long sides, two short sides, and a bottom, the first side of the case being one of the long sides, the first portion being disposed in parallel with the first side of the case, the second portion projecting from the first portion towards the other long side.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the example embodiments set forth herein. Rather, these example embodiments are provided so that this disclosure will be thorough and complete, and will fully convey the scope of the example embodiments to those skilled in the art. In the drawing figures, dimensions may be exaggerated for clarity of illustration. Like reference numerals refer to like elements throughout.

Figure 1:
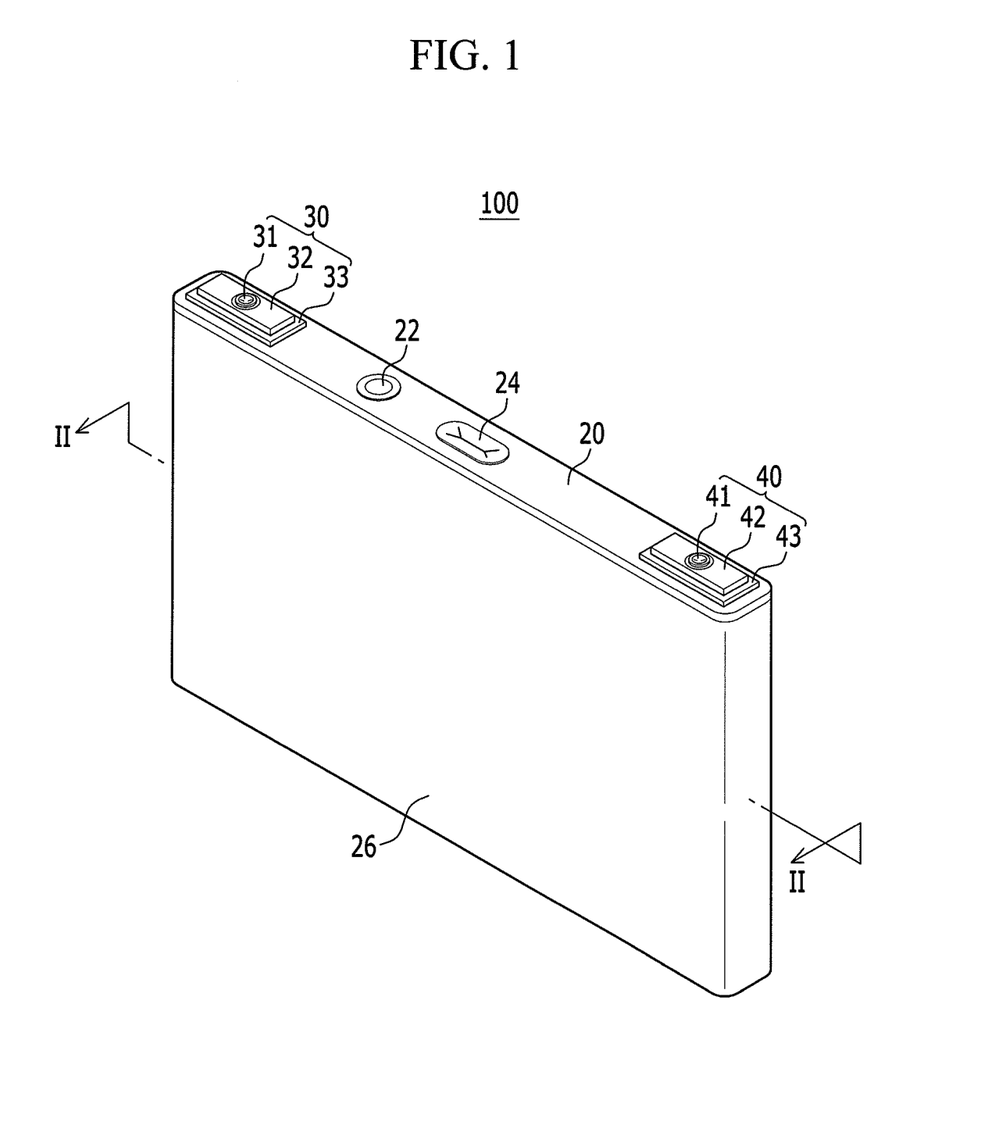
FIG. 1 illustrates a perspective view showing a rechargeable battery according to a first example embodiment.
Figure 2:
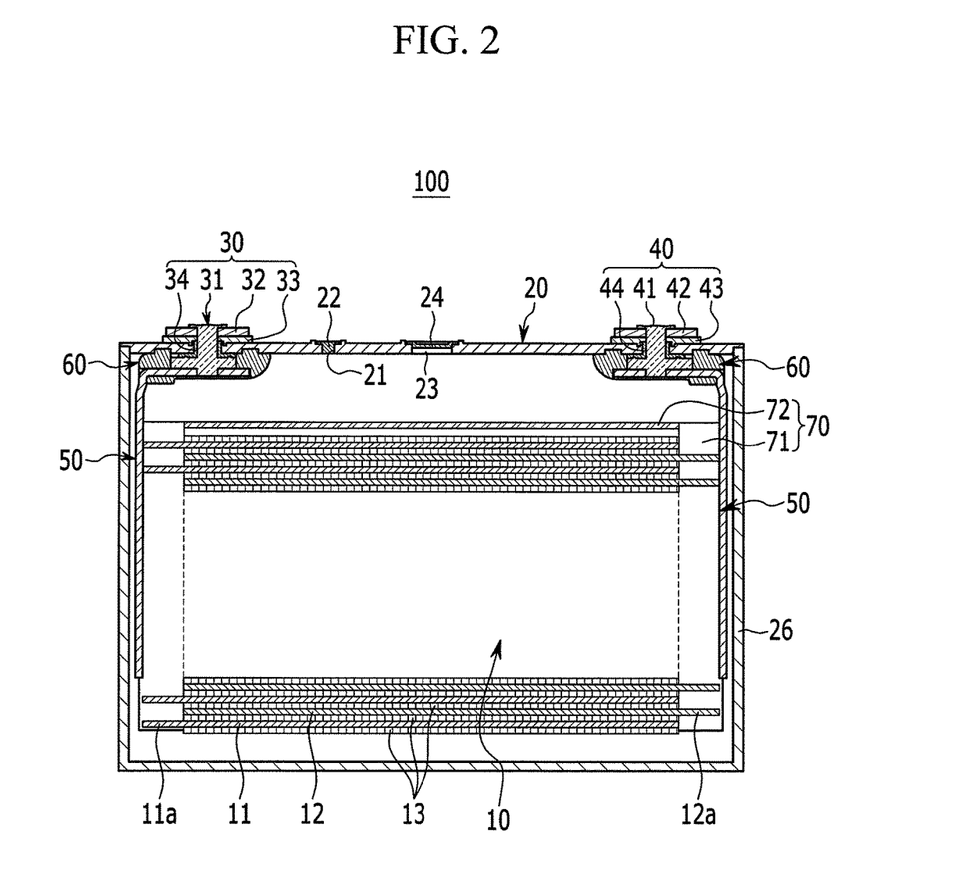
FIG. 2 illustrates a cross-sectional view taken along line II-II in FIG. 1.

FIG. 1 illustrates a perspective view showing a rechargeable battery according to a first example embodiment and FIG. 2 illustrates a cross-sectional view taken along line II-II in FIG. 1.

Referring to the first example embodiment shown in FIGS. 1 and 2, a rechargeable battery 100 may include an electrode assembly 10, a case 26 in which the electrode assembly 10 is encased, a first terminal part 30 and a second terminal part 40 electrically connected with the electrode assembly 10, a cap plate 20 coupled with an opening of the case 26, and a gasket 60 and an insulating member 70 installed in the case 26.

The rechargeable battery 100 according to the present example embodiment is a lithium ion rechargeable battery. Herein, a square rechargeable battery will be described by way of example. In another implementation, the present example embodiment may be applied to a battery such as a lithium polymer battery, or the like.

In addition, a first electrode 11 may be a negative electrode and a second electrode 12 may be a positive electrode, and vice versa.

The first electrode 11 and the second electrode 12 may each include a current collector formed of a thin metal foil and an active material coated on a surface of the current collector.

In addition, the first electrode 11 and the second electrode 12 may be partitioned into a coating part in which an active material is coated on the current collector, and a first electrode non-coated part 11*a* and a second electrode non-coated part 12*a* in which the active material is not coated on the current collector.

The coating part may form a substantial portion of the first electrode 11 and the second electrode 12, and the first electrode non-coated part and the second non-coated part 11*a* and 12*a* may each be disposed at sides of the coating part in a jelly roll state.

The electrode assembly 10 may be wound with the first electrode 11, the second electrode 12, and the separator 13 together to form a jelly roll type. In another implementation, the electrode assembly 10 may be formed in a stacked structure, having the separator 13 between the first electrode 11 and the second electrode 12, e.g., formed as a jelly roll or a plurality of sheets. The separator may be formed of an electrically insulating material.

The first electrode non-coated part 11*a* and the second electrode non-coated part 12*a* of the electrode assembly 10 may be electrically connected to the first terminal part 30 and the second terminal part 40 via an electrode current collection member 50, respectively.

As shown, the case 26 may be formed in an approximately rectangular parallelepiped shape and one surface thereof is provided with an opening. However, the case may be formed in various shapes, such as a cylindrical shape, a pouch shape, or the like.

The cap plate 20 may be formed of a thin plate formed of, e.g., aluminum, and may be coupled with the opening of the case 26 to close the opening.

In addition, the cap plate 20 may be provided with an electrolyte inlet 21 for injecting the electrolyte into the sealed case 26, and the electrolyte inlet 21 may be sealed by a sealing closure 22 after the electrolyte is injected.

The cap plate 20 may be provided with a vent hole 23 mounted with a vent plate 24. The vent plate 24 may be fractured when an internal pressure of the sealed case 26 reaches a set pressure or more.

The first and second terminal parts 30 and 40 may include first and second rivets 31 and 41, first and second terminal plates 32 and 42, first and second terminal insulators 33 and 43 installed between the first and second terminal plates 32 and 42 and the cap plate 20, and first and second terminal gaskets 34 and 44.

The second terminal gasket 44 may be made of a conductive material or an insulating material. When the second terminal gasket 44 according to an example embodiment is made of the conductive material, the case 26 may be electrically connected to the second electrode 12, and the case 26 may have a negative polarity or a positive polarity. On the other hand, when the second terminal gasket 44 according to an example embodiment is made of the insulating material, the case 26 may be maintained in a state in which is electrically neutral, i.e., without having the negative polarity or the positive polarity.

Figure 3:
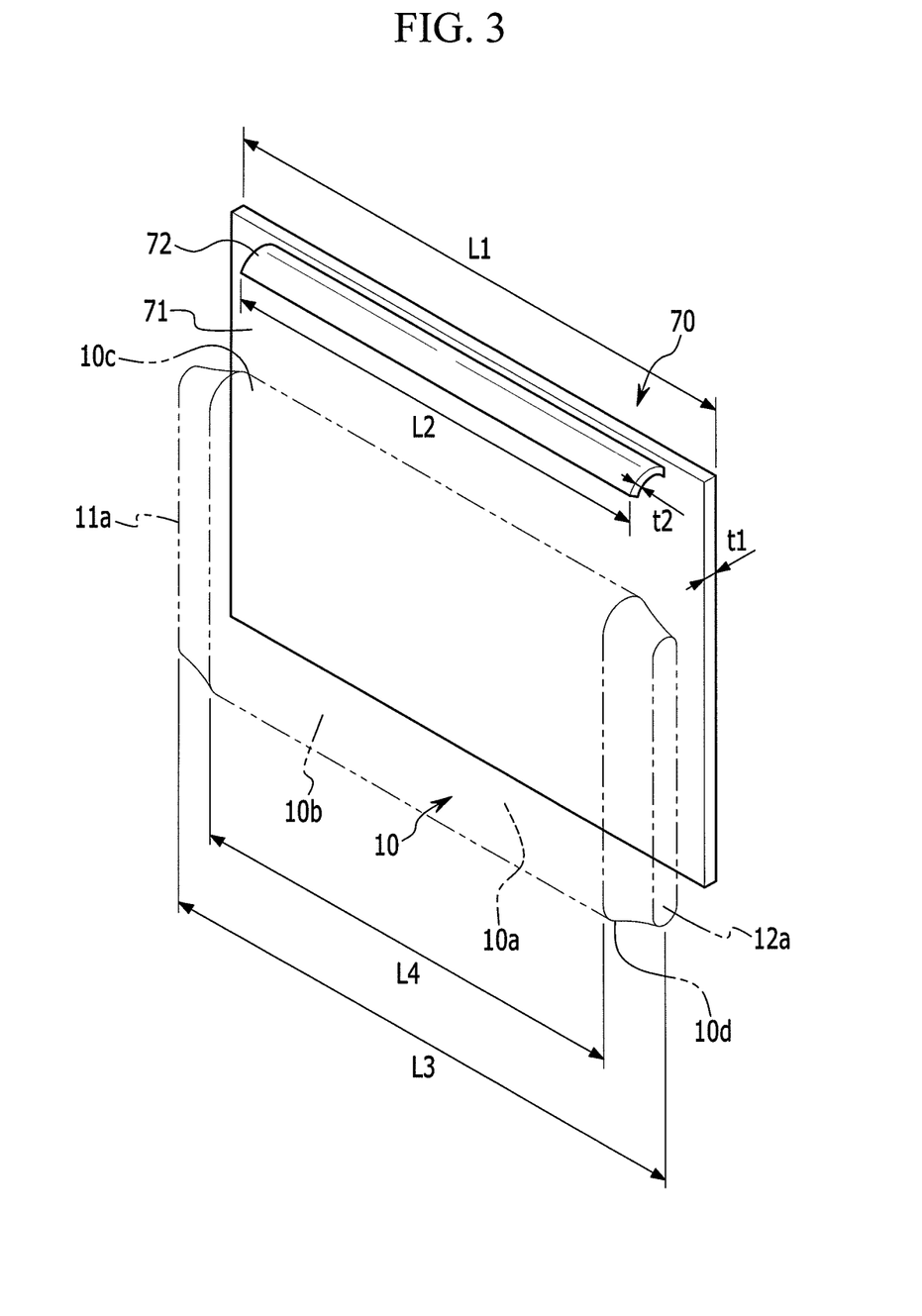
FIG. 3 illustrates a perspective view of an insulating member of a rechargeable battery according to the first example embodiment.
Figure 4:
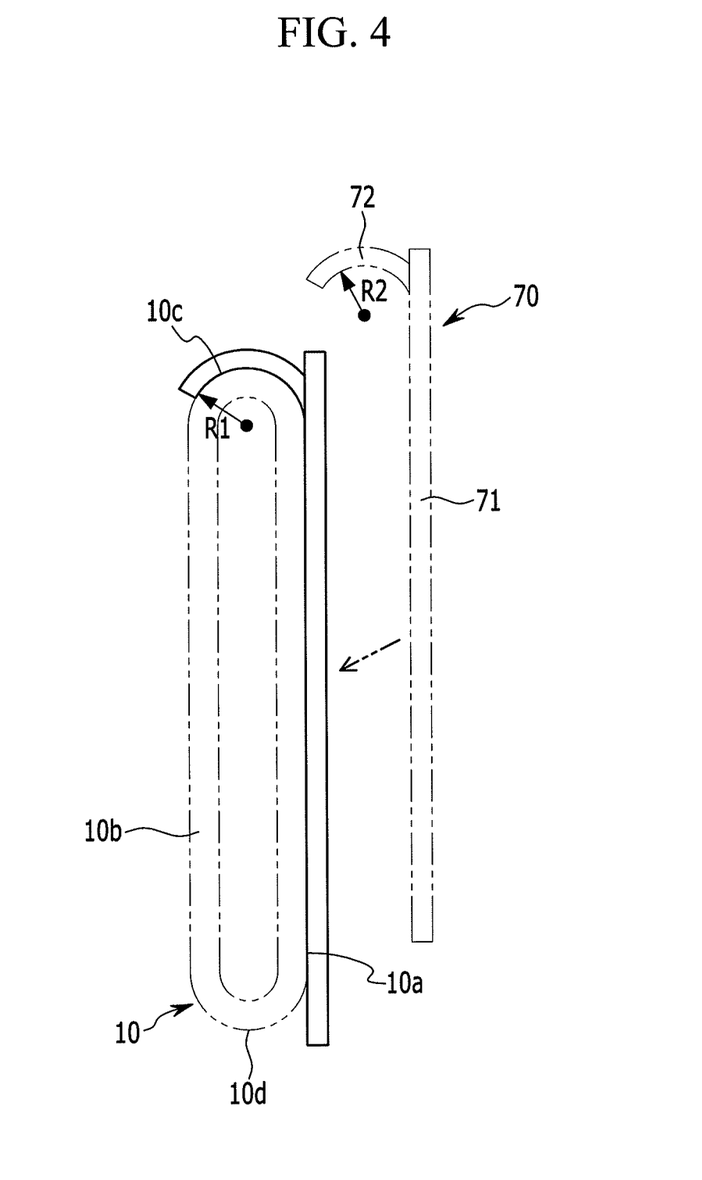
FIG. 4 illustrates a side view of an insulating member in a state in which is coupled to an electrode assembly of FIG. 3.

FIG. 3 illustrates a perspective view of an insulating member of a rechargeable battery according to the first example embodiment and FIG. 4 illustrates a side view of an insulating member in a state in which is coupled to an electrode assembly of FIG. 3.

Referring to FIGS. 3 and 4, the insulating member 70 of the rechargeable battery 100 according to the first example embodiment may include a first insulating plate 71 and a second insulating plate 72.

The electrode assembly 10 according to the present example embodiment has a first surface 10*a* formed between a first electrode non-coated part 11*a* and a second electrode non-coated part 12*a*, a second surface 10*b* positioned at the opposite side of the first surface 10*a* and formed between the first electrode non-coated part 11*a* and the second electrode non-coated part 12*a*, and a third surface 10*c* and a fourth surface 10*d* connecting to each other in one end and the other end of the first surface 10*a* and the second surface 10*b*.

The electrode assembly 10 according to the present example embodiment may be installed in the case 26 so that the third surface 10*c* faces the cap plate 20.

The first insulating plate 71 according to the present example embodiment may have a thin plate shape and may be installed at one side of the electrode assembly 10. The first insulating plate 71 may be installed so as to be closely adhered to the first surface 10*a* of the electrode assembly 10.

A first length L1 of the first insulating plate 71 may extend at least as long as, e.g., the same as, an entire length L3 of the electrode non-coated parts 11a and 12a of the electrode assembly 10. The first insulating plate 71 according to the present example embodiment may prevent an inner side of the case 26 from being physically or electrically contacted with the first surface 10a of the electrode assembly 10 and the first electrode non-coated part 11a and the second electrode non-coated part 12a.

The second insulating plate 72 according to the present example embodiment may be extended from an end of the first insulating plate 71 and may be installed on a surface of the electrode assembly 10 facing the cap plate 20. The second insulating plate 72 may be installed so as to be closely adhered to the third surface 10c of the electrode assembly 10.

Referring to FIG. 4, a cross section of the second insulating plate 72 may have a shape corresponding to that of the third surface 10c of the electrode assembly 10. For example, the shape of the cross section of the third surface 10c of the electrode assembly 10 may be an arch-shape having a first radius of curvature R1. In addition, the shape of the cross section of the second insulating plate 72 may be the arch-shape corresponding to that of the third surface 10c, having a second radius of curvature R2 (however, the shape of the cross section of the second insulating plate 72 is not limited to the arch-shape and may be a shape corresponding to that of the cross section of the third surface 10c of the electrode assembly 10). Here, the first radius of curvature R1 of the third surface 10c of the electrode assembly 10 may be larger than the second radius of curvature R2 of the second insulating plate 72. Therefore, the second insulating plate 72 may be coupled to the third surface 10c in forcedly fitting scheme.

In addition, the second length L2 of the second insulating plate 72 may be the same as or longer than a length L4 of the first surface 10a of the electrode assembly 10. The second insulating plate 72 according to the present example embodiment may prevent the cap plate 20 from being physically or electrically contacted with the third surface 10c of the electrode assembly 10 and the first electrode non-coated part 11a and the second electrode non-coated part 12a.

The second insulating plate 72 may be supported by the first insulating plate 71 to stably fix to the third surface 10c. Thus, the insulating member 70 may be stably coupled to the electrode assembly 10.

The first insulating plate 71 according to the present example embodiment may have a first thickness t1 and the second insulating plate 72 may have a second thickness t2. For example, the first insulating plate 71 may have the first thickness t1 of about 0.1 mm to about 0.25 mm and the second insulating plate 72 may have the second thickness t2 of about 0.05 mm to about 0.2 mm.

The insulating member 70 may be made of a material having high heat resistance, rigidity, insulation, and oil resistance. For example, the insulating member 70 may be made of, e.g., polypropylene, polyethylene, or polyethyleneterephthalate. The insulating member 70 may have heat resistance, rigidity, insulation, and oil resistance, which may help minimize corrosion due to electrolyte leakage in the case 26 or a deformation due to an external force.

The insulating member 70, which may have the heat resistance, the rigidity, the insulation, the oil resistance, and corrosion resistance, may be stably installed to the electrode assembly 10, which may help prevent a short circuit in the case 26 that may occur if the electrode assembly 10 contacts physically or electrically with inner side of the case 26 and the cap plate 20.

Figure 5:
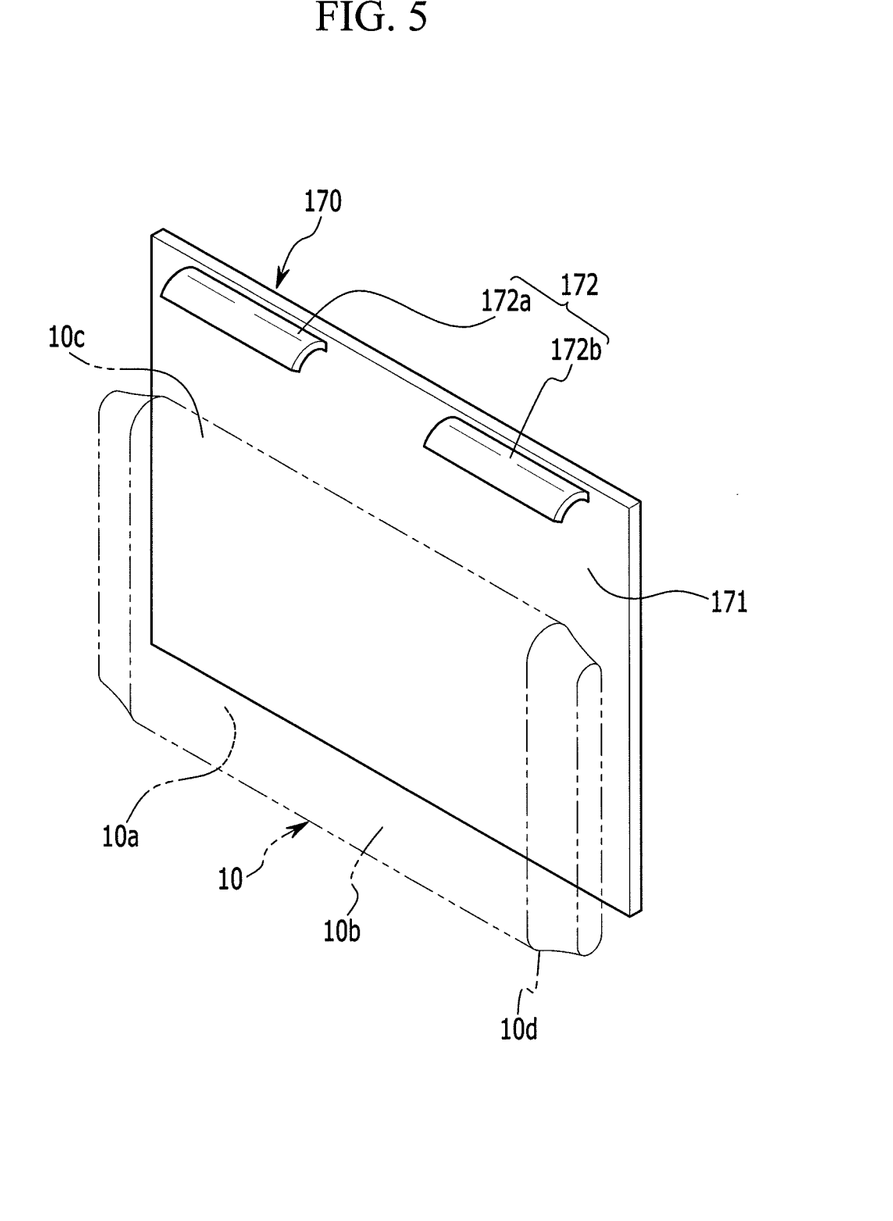
FIG. 5 illustrates a perspective view of an insulating member according to a modified example of the first example embodiment.

FIG. 5 illustrates a perspective view of an insulating member according to a modified example of the first example embodiment.

Referring to FIG. 5, a rechargeable battery according to the present example embodiment may have the same structure as the first example embodiment other than an insulating member 170 and therefore; thus a description of the same structure will be omitted.

In the present example embodiment, the insulating member 170 may include a first insulating plate 171 and a second insulating plate 172.

Here, the insulating member 170 according to the present example embodiment has the same structure as the first example embodiment, other than the second insulating plate 172 and therefore the description of the same structure will be omitted.

The second insulating plate 172 according to the present example embodiment may include a first insulating plate 172a and a second insulating plate 172b extended from one side of the first insulating plate 171.

Each of the first insulating plate 172a and the second insulating plate 172b may be coupled with the third surface 10c of the electrode assembly 10.

In cross section, the first insulating plate 172a and the second insulating plate 172b may have a shape corresponding to that of the third surface 10c of the electrode assembly 10. For example, referring back to FIG. 4, the shape of the cross section of the third surface 10c of the electrode assembly 10 may be an arch-shape having a first radius of curvature R1. In addition, a shape of the cross section each of the first insulating plate 172a and the second insulating plate 172b may be the arch-shaped corresponding to that of the third surface 10c and have predetermined radius of curvature. However, the cross section each of the first insulating plate 172a and the second insulating plate 172b is not limited to the arch-shape and may be a shape corresponding to that of the cross section of the third surface 10c of the electrode assembly 10.

Here, the first radius of curvature R1 of the third surface 10c of the electrode assembly 10 may be larger than the radius of curvature of the first insulating plate 172a and the second insulating plate 172b. Therefore, each of the first insulating plate 172a and the second insulating plate 172b may be coupled to the third surface 10c in forcedly fitting scheme.

The first insulating plate 172a and the second insulating plate 172b may prevent the cap plate 20 from being physically or electrically contacted with the third surface 10c of the electrode assembly 10.

Each of the first insulating plate 172a and the second insulating plate 172b may be supported by the first insulating plate 171a to stably fix the third surface 10c, such that the insulating member 170 may be stably coupled to the electrode assembly 10.

The insulating member 170 according to the present example embodiment may be formed to have the same thickness as that of the insulating member 70 and may be made of the same material as the insulating member 70 according to the first example embodiment. Thus, a detailed description of the thickness and the material of the insulating member 170 will be omitted.

The insulating member 170 may have the heat resistance, the rigidity, the insulation, the oil resistance, and corrosion resistance, and may be stably installed to the electrode assembly 10, such that a short circuit in the case 26 that may occur when the electrode assembly 10 contacts physically or electrically with inner side of the case 26 and the cap plate 20 may be effectively prevented.

Figure 6:
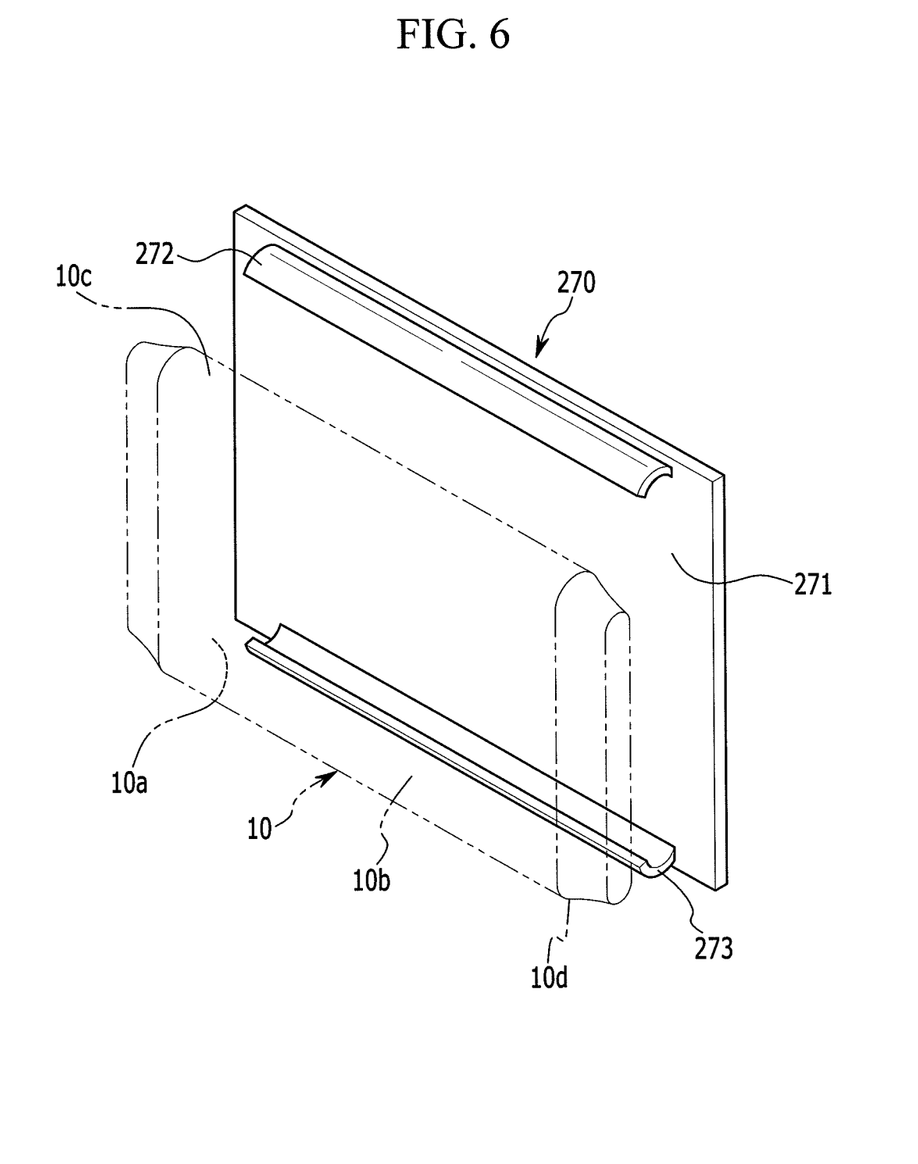
FIG. 6 illustrates a perspective view of an insulating member of a rechargeable battery according to a second example embodiment.
Figure 7:
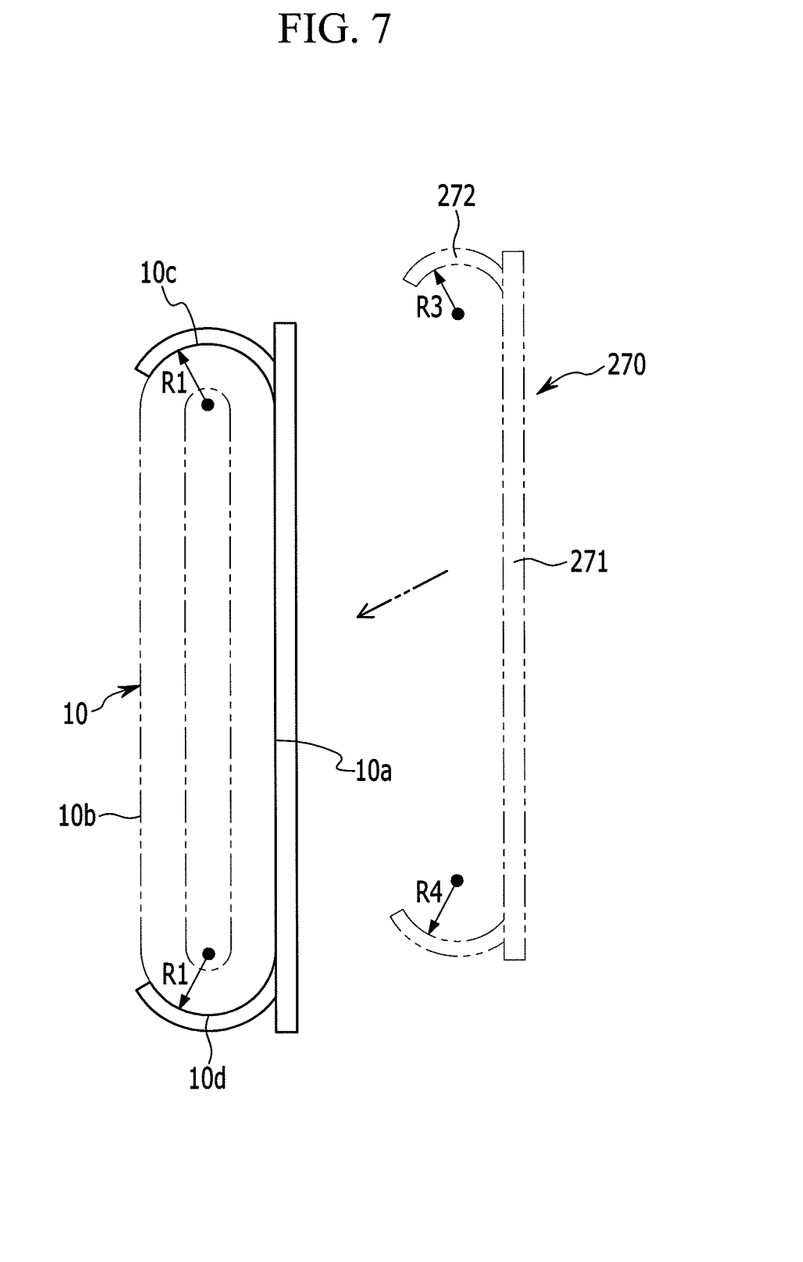
FIG. 7 illustrates a side view of an insulating member in a state in which is coupled to an electrode assembly of FIG. 6.

FIG. 6 illustrates a perspective view of an insulating member of a rechargeable battery according to a second example embodiment and FIG. 7 illustrates a side view of an insulating member in a state in which is coupled to an electrode assembly of FIG. 6.

Describing with reference to FIGS. 6 and 7, the rechargeable battery according to the present example embodiment may have the same structure as the first example embodiment other than the insulating member 270 and therefore the detailed description of the same structure will be omitted.

According to the present example embodiment, the insulating member 270 may include a first insulating plate 271, a second insulating plate 272, and a third insulating plate 273.

The insulating member 270 according to the present example embodiment may have the same structure as the first example embodiment other than the second insulating plate 272 and the third insulating plate 273, and therefore the description of the same structure will be omitted.

The second insulating plate 272 may be extended from a side of the first insulating plate 271 and may be coupled with the third surface 10c of the electrode assembly 10. In addition, the third insulating plate 273 may be extended from the side of the first insulating plate 271 at a position spaced apart from the second insulating plate 272, and may be coupled with the fourth surface 10d of the electrode assembly 10.

The cross section of the second insulating plate 272 and the third insulating plate 273 may have a shape corresponding to those of the third surface 10c and the fourth surface 10d of the electrode assembly 10, respectively. For example, referring back to FIG. 4, the shape of the cross section of the third surface 10c of the electrode assembly 10 may be an arch-shape having a first radius of curvature R1. In addition, a shape of the cross section each of the second insulating plate 272 and the third insulating plate 273 may be the arch-shaped corresponding to that of the third surface 10c.

The second insulating plate 272 may have the third radius of curvature R3 and the third insulating plate 273 may have the fourth radius of curvature R4. However, the shape of the cross section each of the second insulating plate 272 and the third insulating plate 273 is not limited to the arch-shape and may be a shape corresponding to that of the cross section of the third surface 10c of the electrode assembly 10. The first radius of curvature R1 of the third surface 10c of the electrode assembly 10 may be larger than the third radius of curvature R3 of the second insulating plate 272. Therefore, the second insulating plate 272 may be coupled to the third surface 10c in forcedly fitting scheme. In addition, the shape of the cross section of the third insulating plate 273 may be the arch-shape corresponding to that of the fourth surface 10d and have the fourth radius of curvature R4. However, the shape of the cross section of the third insulating plate 273 is not limited to the arch-shape and may be a shape corresponding to that of the cross section of the fourth surface 10d of the electrode assembly 10. Here, the first radius of curvature R1 of the fourth surface 10d of the electrode assembly 10 may be the same as or smaller than the fourth radius of curvature R4 of the third insulating plate 273. In addition, the fourth radius of curvature R4 of the third insulating plate 273 may be larger than the third radius of curvature R3 the second insulating plate 272. Therefore, the third surface 10c of the electrode assembly 10 may be fixed to the second insulating plate 272 in a forced fitting scheme, and the fourth surface 10d of the electrode assembly 10 may be insertedly fixed to the third insulating plate 273, such that the insulating member 270 may be stably fixed to the electrode assembly 10.

The length of the second insulating plate 272 and the third insulating plate 273 may be the same as or longer than a length of the first surface 10a of the electrode assembly 10. Therefore, the second insulating plate 272 and the third insulating plate 273 according to the present example embodiment may prevent the cap plate 20 and the third surface 10c of the electrode assembly 10 from being physically or electrically contacted with the inner side of the case 26 and the fourth surface 10d, and the first electrode non-coated part 11a and the second electrode non-coated part 12a. In addition, each of the second insulating plate 272 and the third insulating plate 273 may be supported by the first insulating plate 271 to stably fix to the third surface 10c and the fourth surface 10d, such that the insulating member 270 may be stably coupled to the electrode assembly 10.

The insulating member 270 according to the present example embodiment may be formed to have the same thickness as that of the insulating member 70 and may be made of the same material as the insulating member 70 according to the first example embodiment. Thus, a detailed description of the thickness and the material of the insulating member 270 will be omitted.

The insulating member 270 may have the heat resistance, the rigidity, the insulation, the oil resistance, and corrosion resistance, and may be stably installed to the electrode assembly 10, such that a short circuit in the case 26 that may occur when the electrode assembly 10 contacts physically or electrically with inner side of the case 26 and the cap plate 20 may be effectively prevented.

Figure 8:
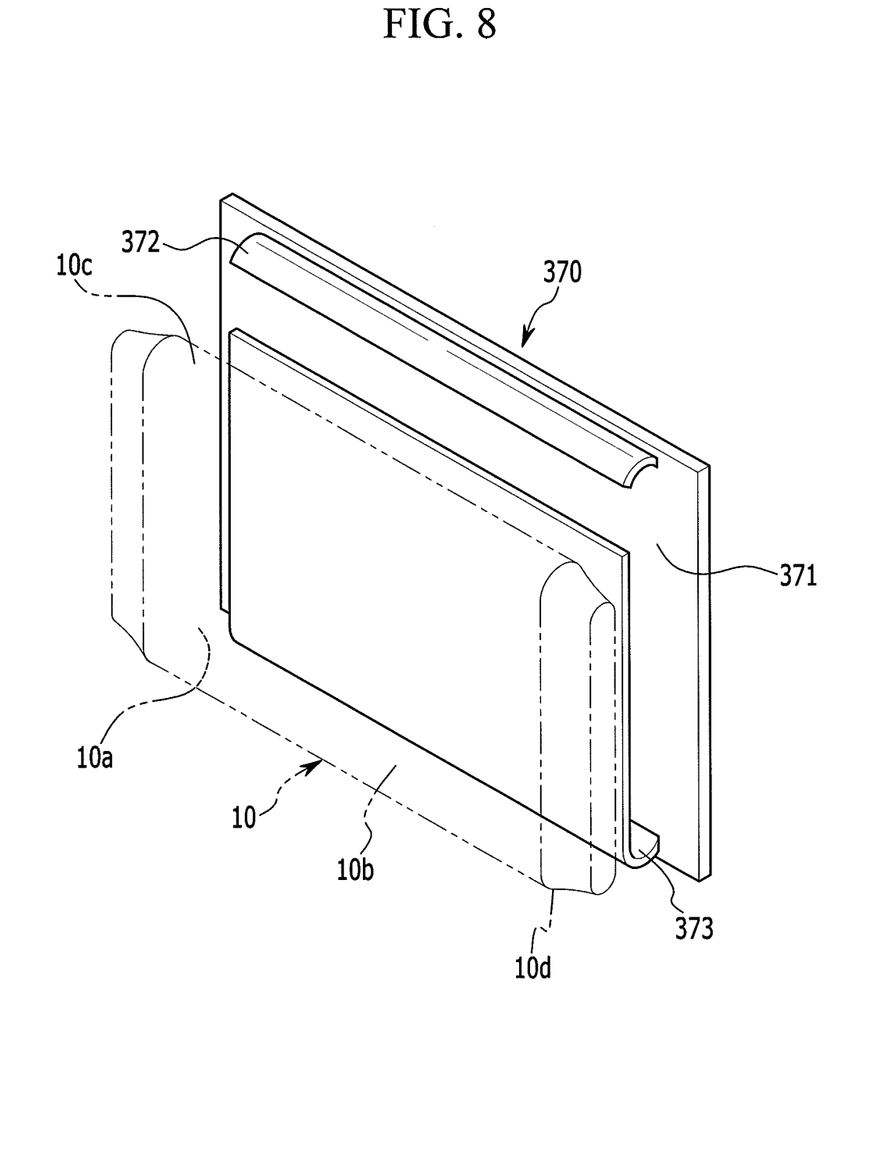
FIG. 8 illustrates a perspective view of an insulating member of a rechargeable battery according to a third example embodiment.
Figure 9:
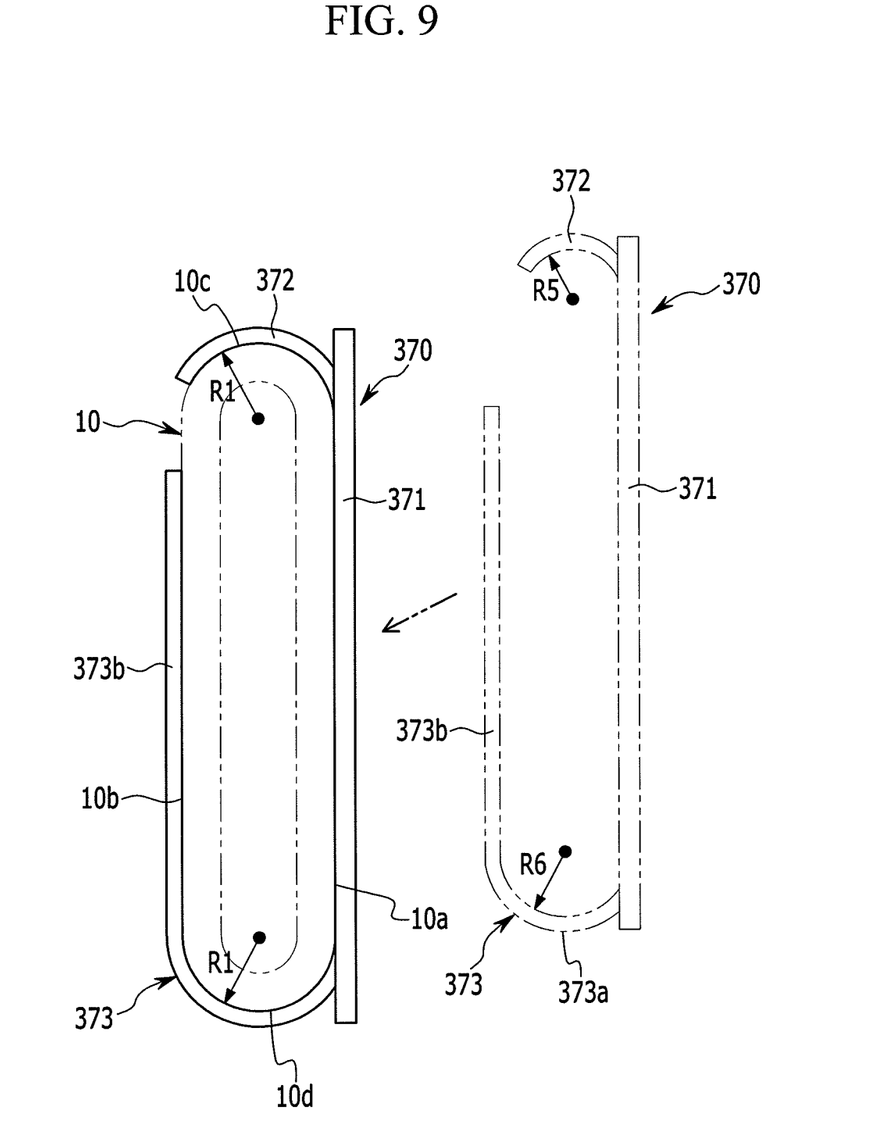
FIG. 9 illustrates a side view of an insulating member in a state in which is coupled to an electrode assembly of FIG. 8.

FIG. 8 illustrates a perspective view of an insulating member of a rechargeable battery according to a third example embodiment and FIG. 9 illustrates a side view of an insulating member in a state in which is coupled to an electrode assembly of FIG. 8.

Referring to FIGS. 8 and 9, the rechargeable battery according to the present example embodiment may have the same structure as the first example embodiment other than the insulating member 370, and therefore the detailed description of the same structure will be omitted.

The insulating member 370 may include a first insulating plate 371, a second insulating plate 372, and a third insulating plate 373.

The insulating member 370 according to the present example embodiment may have the same structure as the first example embodiment, other than the second insulating plate 372 and the third insulating plate 373, and therefore the description of the same structure will be omitted and therefore, the description of the same structure will be omitted.

The second insulating plate 372 may be extended from a side of the first insulating plate 371 and may be coupled with the third surface 10c of the electrode assembly 10. The cross-section of the second insulating plate 372 may have a shape corresponding to that of the third surface 10c of the electrode assembly 10. For example, the shape of the cross section of the third surface 10c of the electrode assembly 10 may be an arch-shape having a first radius of curvature R1. In addition, the shape of the cross section of the second insulating plate 372 may be the arch-shape corresponding to that of the third surface 10c, having a fifth radius of curvature R5. However, the shape of the cross section of the second insulating plate 372 is not limited to the arch-shape and may be a shape corresponding to that of the cross section of the third surface 10c of the electrode assembly 10.

The first radius of curvature R1 of the third surface 10c of the electrode assembly 10 may be larger than the fifth radius of curvature R5 of the second insulating plate 372. Therefore, the second insulating plate 72 may be coupled to the third surface 10c in forcedly fitting scheme. In addition, the length of the second insulating plate 372 may be the same as or longer than a length of the first surface 10a of the electrode assembly 10. Therefore, the second insulating plate 372 according to the present example embodiment may prevent the cap plate 20 and the third surface 10c of the electrode assembly 10 from being physically or electrically contacted with the first electrode non-coated part 11a and the second electrode non-coated part 12a.

The third insulating plate 373 and the second insulating plate 372 may be spaced apart from each other and may be formed to face each other.

The third insulating plate 373 may include a first insulating unit 373a and a second insulating unit 373b extended from a side of the first insulating unit 373a. The cross-section of the first insulating unit 131a may have a shape corresponding to that of the fourth surface 10d of the electrode assembly 10. For example, the shape of cross section of the fourth surface 10d of the electrode assembly 10 according to the present example embodiment may be an arch-shape and have a first radius of curvature R1 the same with the radius of curvature of the third surface 10c. In addition, the shape of the cross section of the first insulating unit 373a may be the arch-shape corresponding to that of the fourth surface 10d and have the sixth radius of curvature R6. However, the shape of the cross section of the first insulating unit 373a is not limited to the arch-shape and may be a shape corresponding to that of the cross section of the fourth surface 10d of the electrode assembly 10. The first radius of curvature R1 of the fourth surface 10d of the electrode assembly 10 may be the same as or smaller than the sixth radius of curvature R6 of the first insulating unit 373a. In addition, the sixth radius of curvature R6 of the first insulating unit 373a may be larger than the fifth radius of curvature of the second insulating plate 372. Therefore, the third surface 10c of the electrode assembly 10 may be fixed to the second insulating plate 372 in a forced fitting scheme, and the fourth surface 10d of the electrode assembly 10 may be insertedly fixed to the first insulating unit 373a, such that the insulating member 370 may be stably fixed to the electrode assembly 10.

The second insulating plate 373b may be installed so as to be closely adhered to the second surface 10b of the electrode assembly 10. For example, the second insulating unit 373b according to the present example embodiment may be extended from a side of the first insulating unit 373a and may be positioned close to the second surface 10b of the electrode assembly 10 when the third surface 10c of the electrode assembly 10 is inserted into the first insulating unit 373a and fixed thereto. Therefore, the insulating member 370 may be stably fixed to the electrode assembly 10 by the second insulating unit 373b. The length of the third insulating plate 373 may be the same as or longer than the length of the first surface 10a of the electrode assembly 10. Therefore, each of the first insulating unit 373a and the second insulating unit 373b of the third insulating plate 373 according to the present example embodiment may prevent the case 26 from being physically or electrically contacted with the second surface 10b and the fourth surface 10d of the electrode assembly 10, and the first electrode non-coated part 11a and the second electrode non-coated part 12a.

The insulating member 370 according to the present example embodiment may be formed to have the same thickness as that of the insulating member 70 and may be made of the same material as the insulating member 70 according to the first example embodiment. Thus, a detailed description of the thickness and the material of the insulating member 370 will be omitted.

The insulating member 370 may have the heat resistance, the rigidity, the insulation, the oil resistance, and corrosion resistance, and may be stably installed to the electrode assembly 10, such that a short circuit in the case 26 that may occur when the electrode assembly 10 contacts physically or electrically with inner side of the case 26 and the cap plate 20 may be effectively prevented.

By way of summation and review, a case of the rechargeable battery may be manufactured in a cylindrical shape or a squared shape. As a material of the case of the rechargeable battery, aluminum having excellent formability and electrical conductivity may be used. However, in the case of the case of the rechargeable battery made of the aluminum material, when an external force is applied to surface, the case may be modified, e.g., bent, such that a current collector, an electrode assembly, or the like installed in the case and the case are electrically connected to each other, thereby causing a short circuit in the case. Therefore, a film made of a synthetic resin may be installed between the case of the rechargeable battery and the electrode assembly to prevent the short circuit from being generated due to the deformation of the case. However, the film made of the synthetic resin may be melted by an electrolyte in the inner portion of the case. In addition, the film made of the synthetic resin may be deformed by heat generated when a cap plate is adhered to the case, such that an insulation performance may be degraded.

As described above, example embodiments relate to a rechargeable battery having an improved structure of an insulating member installed in a case. Embodiments may provide a rechargeable battery including an insulating member that may help prevent a short circuit in the rechargeable battery while securing an insulation property in a case. Embodiments may avoid melting and the deformation of the insulating member due to the electrolyte in the case and the deformation of the case, which may help prevent a short circuit in the rechargeable battery from being generated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular example embodiment may be used singly or in combination with features, characteristics, and/or elements described in connection with other example embodiments unless otherwise specifically indicated. Accordingly, it will be understood by those of skill in the art that various changes in form and details may be made without departing from the spirit and scope of the present invention as set forth in the following claims.

<Description of symbols>

| | |
|---|---|
| 100: rechargeable battery | 10: electrode assembly |
| 10a: first surface | 10b: second surface |
| 10c: third surface | 10d: fourth surface |
| 11: first electrode | 12: second electrode |

-continued

<Description of symbols>

| | |
|---|---|
| 13: separator | 30: first terminal unit |
| 31: first rivet | 32: first terminal plate |
| 33: first terminal insulator | 40: first terminal unit |
| 50: electrode current collector | 60: gasket |
| 70, 170, 270, 370: insulating member | |
| 71, 171, 271, 371: the first insulating plate | |
| 273, 373: the third insulating plate | |

What is claimed is:

1. A rechargeable battery, comprising:
a case having a cap plate at one side thereof;
an electrode assembly disposed in the case; and
an insulating member disposed in the case, the insulating member being fixed to the electrode assembly, the insulating member including a first portion and a second portion, the second portion extending from the first portion and contacting the electrode assembly at a coated region of the electrode assembly, the first portion extending beyond the second portion in a longitudinal direction of the cap plate,
wherein the second portion projects from a side of the first portion that contacts the electrode assembly, such that the second portion extends past a longitudinal central axis of the electrode assembly to overhang a top of the electrode assembly, the longitudinal central axis being parallel to the longitudinal direction of the cap plate.

2. The rechargeable battery as claimed in claim 1, wherein:
the electrode assembly is wound, is disposed in the case with a winding axis that is parallel to the longitudinal direction of the cap plate, and has flat side surfaces and curved edges, and
the second portion has a curved shape and contacts one of the curved edges of the electrode assembly, the second portion being conformal along the curved edge of the electrode assembly.

3. The rechargeable battery as claimed in claim 2, wherein the first portion has a plate shape and contacts a flat side of the electrode assembly, and an extending part of the first portion does not directly contact the electrode assembly.

4. The rechargeable battery as claimed in claim 2, wherein the second portion is elastically deformable and has a radius of curvature, prior to being combined with the electrode assembly, that is smaller than a radius of curvature of the curved edge of the electrode assembly.

5. The rechargeable battery as claimed in claim 4, wherein the second portion includes a plurality of parts that have a radius of curvature, prior to being combined with the electrode assembly, that is the same as or smaller than a radius of curvature of the curved edge of the electrode assembly, the parts being disposed along the curved edge of the electrode assembly.

6. The rechargeable battery as claimed in claim 2, wherein the second portion has a shape corresponding to the curved edge of the electrode assembly.

7. The rechargeable battery as claimed in claim 2, wherein the second portion extends along the curved edge of the electrode assembly in the longitudinal direction of the cap plate.

8. The rechargeable battery as claimed in claim 1, wherein the first portion has first and second edges spaced apart by a first width, the first width being at least as great as a width of the electrode assembly.

9. The rechargeable battery as claimed in claim 1, wherein the first portion has a width and a height to prevent any edge of the electrode assembly from projecting beyond an edge of the first portion when the insulating member is combined with the electrode assembly.

10. The rechargeable battery as claimed in claim 1, wherein the second portion is directly on the top of the electrode assembly and proximate to the cap plate that closes the case, and the second portion is between the electrode assembly and the cap plate.

11. The rechargeable battery as claimed in claim 10, wherein the first portion is interposed between the electrode assembly and a side of the case.

12. The rechargeable battery as claimed in claim 1, wherein the insulating member includes a third portion that extends from the first portion, the third portion opposing the second portion with the electrode assembly therebetween.

13. The rechargeable battery as claimed in claim 12, wherein the third portion is curved to correspond to a curved edge of the electrode assembly.

14. The rechargeable battery as claimed in claim 12, wherein the third portion contacts the electrode assembly at a coated region of the electrode assembly.

15. The rechargeable battery as claimed in claim 12, wherein the third portion includes a curved part and a flat part, the curved part extending from the first portion, the flat part extending from the curved part and at least partially covering a side of the electrode assembly.

16. The rechargeable battery as claimed in claim 15, wherein the electrode assembly is interposed between the first portion and the flat part of the third portion.

17. The rechargeable battery as claimed in claim 1, wherein the electrode assembly includes a first electrode, a second electrode, and a separator interposed between the first and second electrodes, the separator being formed of an insulating material, the separator contacting the insulating member.

18. The rechargeable battery as claimed in claim 1, wherein the case is rectangular, having two long sides, two short sides, and a bottom, the first side of the case being one of the long sides, the first portion being disposed in parallel with the first side of the case, the second portion projecting from the first portion towards the other long side, such that the second portion covers a majority of the top of the electrode assembly.

19. A rechargeable battery, comprising:
a case having a cap plate at one side thereof;
an electrode assembly disposed in the case; and
an insulating member disposed in the case, the insulating member being fixed to the electrode assembly, the insulating member including a first portion, a second portion, and a third portion, the second portion extending from the first portion and contacting the electrode assembly at a coated region of the electrode assembly, the first portion extending beyond the second portion in a longitudinal direction of the cap plate, and the third portion extending from the first portion and opposing the second portion with the electrode assembly therebetween,
wherein the second portion projects from a side of the first portion that contacts the electrode assembly,
wherein the third portion includes a curved part and a flat part, the curved part extending from the first portion, the flat part extending from the curved part and at least partially covering a side of the electrode assembly, the electrode assembly being between the first portion and the flat part of the third portion, and wherein:
the second portion is proximate to the cap plate that seals the case, and the curved part of the third portion is proximate to a bottom of the case, and
the first portion is proximate to a first side of the case, and the flat part of the third portion is proximate to a second side of the case, wherein the second side is disposed on an opposing side to the first side.

20. The rechargeable battery as claimed in claim 19, wherein:
the electrode assembly is interposed between the first portion and the flat part of the third portion, and
the first portion, the electrode assembly, and the flat part of the third portion are interposed between the first and second sides of the case.

* * * * *